United States Patent [19]

Carlson et al.

[11] 4,193,101

[45] Mar. 11, 1980

[54] COLLET LOADING APPARATUS

[75] Inventors: John A. Carlson; Kenneth D. Rusch; David L. Sippel, all of Rochester, Minn.

[73] Assignee: International Business Machines Corporation, Armonk, N.Y.

[21] Appl. No.: 950,756

[22] Filed: Oct. 12, 1978

[51] Int. Cl.$^2$ ............... G11B 5/012; G11B 21/22; G11B 5/54; G11B 3/62

[52] U.S. Cl. ............... 360/97; 360/105; 346/137; 274/9 B; 274/39 A

[58] Field of Search ............... 360/97, 99; 346/137; 274/9 B, 39 A

[56] References Cited

U.S. PATENT DOCUMENTS 4,040,106  8/1977  Medley ............... 360/99

OTHER PUBLICATIONS

Neubauer et al., "Low Profile Diskette Drive", IBM Tech. Disc. Bull., vol. 20, No. 10, Mar. 1978, p. 4066.

*Primary Examiner*—Robert S. Tupper
*Attorney, Agent, or Firm*—Keith T. Bleuer

[57] ABSTRACT

Apparatus for loading a collet with respect to a rotatable drive hub of a magnetic disk drive machine for gripping a magnetic disk between the collet and drive hub including a leaf spring supported at opposite ends with respect to a machine frame and carrying the collet at an intermediate place between the ends. One of the ends of the spring is pivotally mounted on the frame, and a manually rotatable lever applies a force onto the leaf spring between its pivotal mounting and the collet so as to move the collet to engage the disk between the collet and drive hub against the resilience of the leaf spring. The leaf spring is relatively wide in its portion between its pivotal mounting and the collet and is relatively narrow between the collet and its other end so that the narrow portion of the spring bends the wide portion of the spring as the collet is moved toward the hub whereby the collet uniformly grips the disk with respect to the hub and whereby the longitudinal center of the collet remains nearly coincident with the longitudinal center of the hub as the collet completes its disk engaging movement with respect to the hub to avoid side thrust on the disk.

10 Claims, 5 Drawing Figures

COLLET LOADING APPARATUS

CROSS-REFERENCE TO RELATED APPLICATION

This application is related to that of W. E. Beuch, G. J. O'Konski and K. D. Rusch on Disk Drive Machine, Ser. No. 950,886, filed Oct. 12, 1978.

BACKGROUND OF THE INVENTION

The invention relates to magnetic disk drive machines and more particularly to mechanisms for loading a collet with respect to a rotatable machine hub for the purpose of gripping and driving a magnetic disk so that data transfer may take place with respect to the disk.

Many magnetic disk drive machines in present usage include a collet which in effect is mounted on a swingable lever pivoted on one end so that the collet is swung toward engaging position with a rotatable machine hub for the purpose of gripping a magnetic disk between the collet and hub. The lever on which the collet is mounted may in actuality be a swinging cover or door for closing the disk file machine in addition to engaging the collet with the drive hub during swinging movement. A machine of this type is disclosed in U.S. Pat. No. 4,089,029.

SUMMARY OF THE INVENTION

It is an object of the present invention to provide an improved collet loading apparatus for a magnetic disk drive machine which is so constructed that the collet is moved toward a rotatable machine or drive hub for the purpose of engaging a disk therebetween, with the longitudinal centers of the hub and collet being very nearly coincident for the complete movement of the collet and being accurately coincident for the last increment of movement of the collet toward engagement with the machine hub so that the disk engaging faces of the hub and collet grip the disk therebetween with uniform force for the complete circumference of the collet and hub and so that the collet does not provide any side force or motion on the disk during a clamping of the disk by the collet with respect to the drive hub.

It is also an object of the invention to provide an improved collet loading apparatus which requires less space than a swinging door or the like for mounting a collet so that the disk drive machine as a whole may be of less thickness in the directions of the longitudinal centers of the collet and hub.

The collet loading apparatus of the invention in a preferred form includes a leaf spring which carries the collet at an intermediate place thereon and which bears on the frame of the disk drive machine at the ends of the leaf spring and which is bowed in the direction of the rotatable drive hub of the machine. The leaf spring is pivotally mounted with respect to the machine frame at one end of the spring and slideably bears on the frame at its other end to be supported thereby at the latter end. The spring includes a relatively wide leg portion, which is thus relatively stiff, between the pivotal mounting of the spring on the frame and the place of collet mounting and includes a relatively narrow and less stiff leg portion extending from the collet mounting to the other end of the leaf spring. A force applying selectively rotatable element is provided for applying a force onto the leaf spring between its pivotal mounting and the collet mounting so as to reduce this bowing of the spring against its resiliency and to move the collet toward the hub to grip a magnetic disk between the collet and hub. The relatively narrow leg portion bends the relatively wide leg portion between the collet mounting and the place at which the rotatable element applies a collet closing force so that, even though the spring pivots about its pivotal connection with the frame at one end of the spring, the collet has its longitudinal center remaining nearly in alignment with the longitudinal center of the hub for the movement of the collet to its disk clamping position with respect to the hub.

DESCRIPTION OF THE PREFERRED EMBODIMENT

Figure 5:
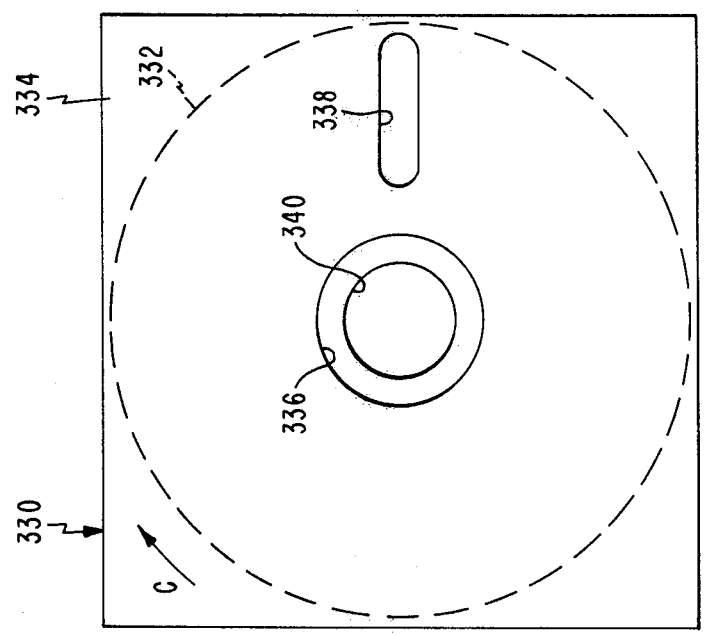
FIG. 5 is a plan view of a magnetic disk assembly used in the disk drive machine.

A magnetic disk assembly or diskette 330 useable in the disk drive machine described herein is shown in FIG. 5 hereof and is of the type disclosed in U.S. Pat. No. 3,668,658 (which may be referred to for details of construction). Referring to FIG. 5 hereof, the diskette 330 may be seen to comprise a thin flexible magnetic disk 332 which is rotatably disposed in a rectangular jacket 334 of material that is somewhat thicker and more rigid than that of the disk 332. The jacket 334 has closed side edges so that the disk may not slide out of the jacket and has aligned central round holes 336 and aligned radially extending slots 338 in its two thicknesses. The disk 332 has a central hole 340 which is somewhat smaller than the holes 336 and is axially aligned with the holes 336.

Figure 1:
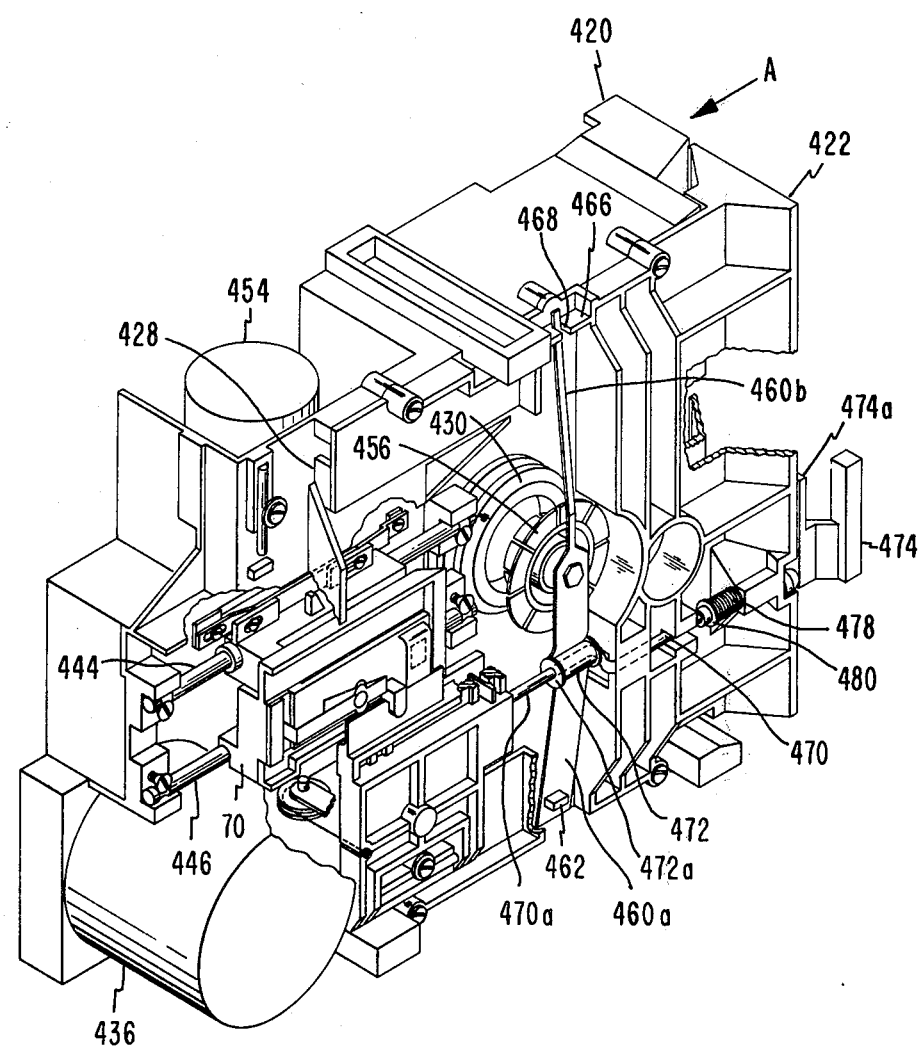
FIG. 1 is a fragmentary isometric view of a disk drive machine incorporating the collet loading apparatus of the invention which includes a dual width collet loading leaf spring actuated by means of a manually rotatable knob located on one end of the machine.

Referring to FIG. 1, the illustrated disk drive machine may be seen to include a main frame 420 and an auxiliary frame 422 screwed to the frame 420 and thus together forming a machine frame. The frame 422 is formed with a slot 424 adapted to constitute an entrance slot for the magnetic diskette 330. The diskette is moved in direction A into the machine, and the frame 420 includes a pair of stops 428 for limiting the movement of the diskette in direction A.

A machine or drive hub 430 is fixed on a shaft 432 (see FIGS. 3 and 4) by means of which the hub 430 is rotatably disposed on and carried by the frame 420. The hub 430 has a face portion 430a disposed in a plane that is perpendicular to the longitudinal center line C of the shaft 432 and has a central cavity 430b. The shaft 432 and thus the hub 430 are driven by any suitable drive connections (not shown) from an electrical motor 436 that is fixed to the frame 420.

A magnetic transducer carriage 70 is reciprocably disposed on a pair of guide rods 444 and 446 that are fixed on the frame 420. The carriage 70 may be of the same type as the carriage 70 of U.S. Pat. No. 4,089,029 which includes magnetic heads 150 and 152 as shown in the patent adapted to extend through and to travel along longitudinal slots 338 in the jacket 334 of the magnetic diskette 330 hereof. An electric motor 454 has suitable mechanical connections with the carriage so as to cause the carriage to move along the rods 444 and 446 to thereby cause the transducers to rest on the magnetic disk 332 of the diskette 330 in different positions.

A collet 456 is rotatably carried by a shaft 458 that is fixed to a leaf spring 460 at the middle of the leaf spring. The collet 456 has a forward tapered portion 456a and a flange 456b with a face 456c facing the hub face 430a. The flange face 456c is at right angles to the longitudinal center c of the collet 456 and the shaft 458 supporting the collet 456.

Figure 2:
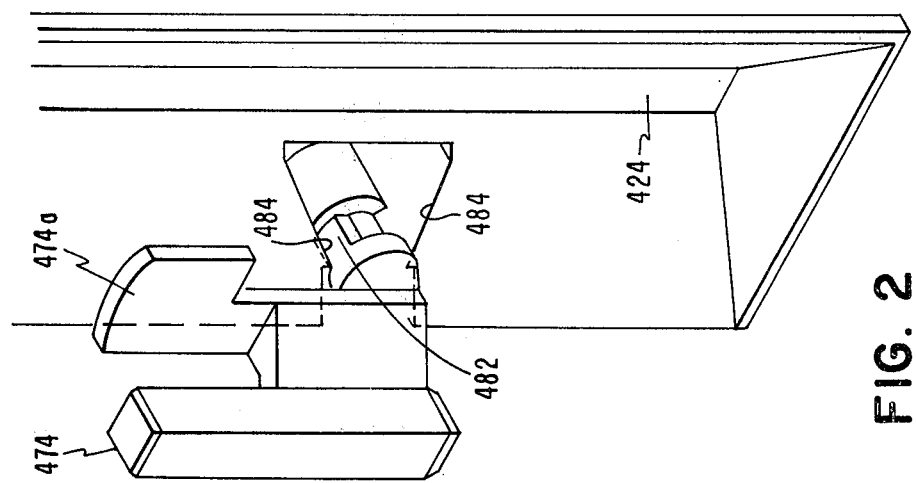
FIG. 2 is a fragmentary elevational view of the last mentioned end of the machine.
Figures 3, 4:
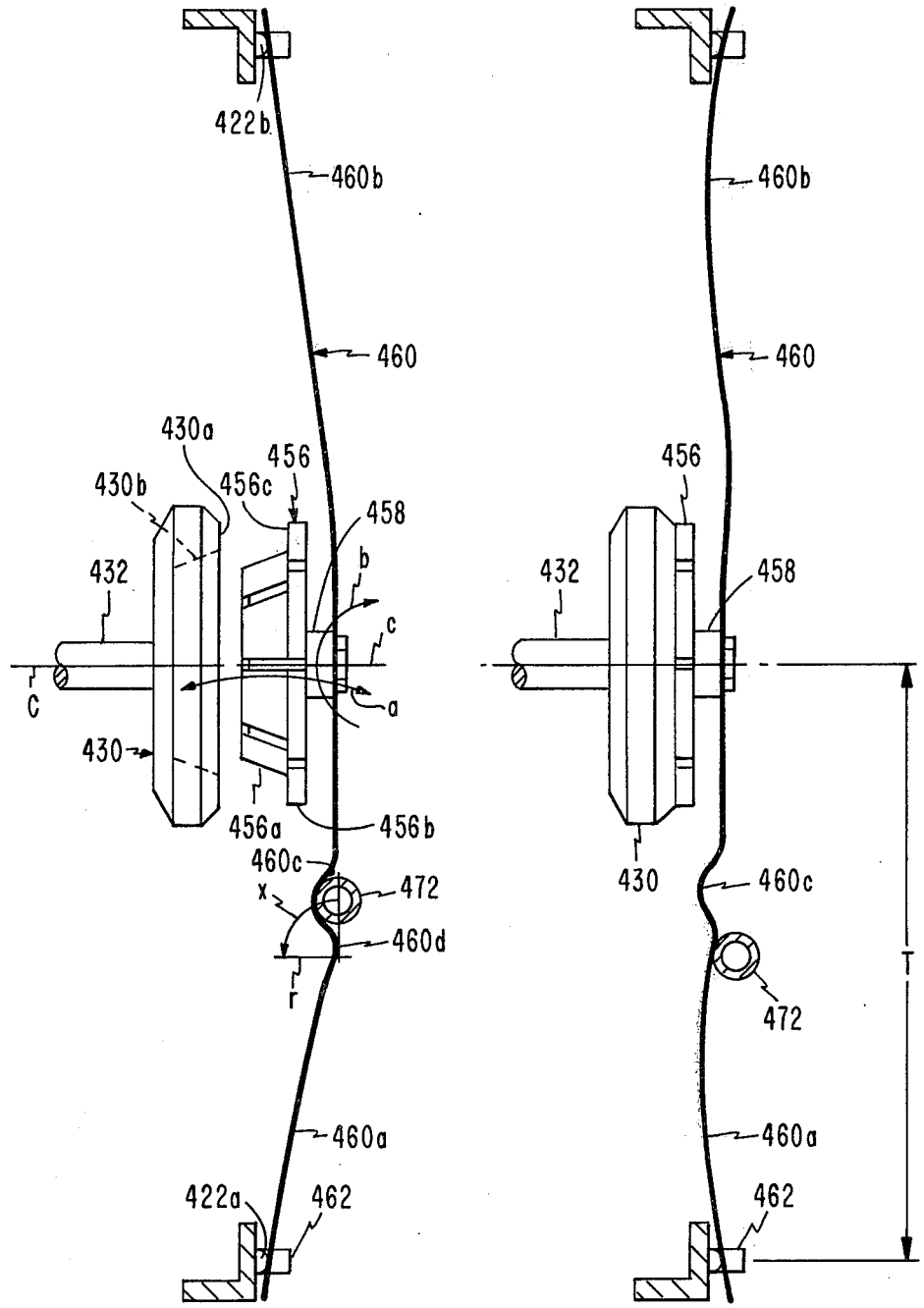
FIG. 3 is an end elevational view of the leaf spring together with a collet and a machine hub with which the collet cooperates, with the collet being in unloaded position.
FIG. 4 is an end elevational view similar to that of FIG. 3 but with the collet in loaded position.

A boss 462 formed on the frame 422 extends through the leaf spring 460 adjacent the bottom end of the spring 460 as it is shown in FIGS. 2 and 3 thus providing a pivotal connection of the spring 460 with the frame 422. The lower end of the spring 460 is supported by a frame boss 422a. The spring 460 is formed with a relatively wide leg portion 460a and with a relatively narrow leg portion 460b that join at the middle of the spring 460 at approximately the location of the shaft 458. Due to the differences in width of the leg portions 460a and 460b, the leg portion 460a is relatively stiff in comparison with the leg portion 460b. The frame 422 is provided with a pair of side stops 466 providing a slot 468 between them, and the upper end of the relatively narrow leg portion 460b of the leaf spring 460 extends through the slot 468 and between the side stops 466 to provide a sliding connection of the spring leg portion 460b with the frame 422 and particularly on a frame boss 422b.

The collet 456 is moved toward the machine hub 430 with a bending of the leaf spring 460 due to the action of an oscillatable shaft 470 extending through portions of the frame 422. The spring 460 is initially bowed outwardly away from the hub 430, and the shaft 470 reduces this bow of the spring to move collet 456. The shaft 470 is provided with an eccentric offset portion 470a, and a roller 472 is rotatably disposed on the offset shaft portion 470a. The roller 472 has end flanges 472a on opposite side edges of the spring leg portion 460a so that the roller 472 remains in full engagement with the spring leg portion 460a. The leg portion 460a midway between the shaft 458 and boss 462 is bent to have a depression 460c and a boss 460d on the face of it with which the roller 472 is in contact.

A knob 474 is fixed to the outer end of shaft 470. A spring 478 exerts a force on the frame 422 and on a washer 480 fixed on shaft 470 to thus hold knob 474 against the frame 422. The knob 474 has a stop 482 which strikes stop surfaces 484 on frame 422 to prevent the turning of knob 474 more than 90° (see FIG. 2).

The spring 460 in a free condition has a greater bow in it than shown in FIG. 3 and in assembled condition as shown in FIG. 3 has its bow reduced by the roller 472 bearing on the spring. The spring 460 is thus held firmly in place at its ends with respect to the frame 422. In the collet engaged FIG. 4 condition of the spring 460, the spring is slightly reversely bowed due to the force exerted on it by the roller 472, and this force also holds the spring firmly in place at its ends on the frame 422. In the FIG. 3 condition, the roller 472 rests in the depression 460c, and the force exerted by the spring on the roller 472 thus yieldably holds the shaft 470 and knob 474 in their FIG. 1 collet disengaging positions.

In operation, a magnetic diskette 330 is moved in direction A into and through the slot 424 and thereby into the disk drive machine until the diskette bottoms against the stops 428. The knob 474 at this time is in its position as illustrated in FIG. 2, with its wing portion 474a extending in substantially the same direction as the slot 424 so that the wing portion 474a does not prevent entrance of the diskette 330 into the slot 424. In this position of the knob 474, the spring 460 and the collet 456 are in their dispositions illustrated in FIG. 3, with there being a substantial separation between the collet 456 and hub 430, so that the diskette 330 moves between the hub 430 and collet 456 in this movement of the diskette toward and into contact with the stops 428.

The knob 474 is then rotated about 90 degrees in the clockwise direction as it is illustrated in FIG. 2 so that the wing portion 474a of the knob 474 moves across the slot 424. The shaft 470, which is fixed to the knob 474, rotates along with the knob 474; and the roller 472 rotates on the offset shaft portion 470a and rolls across the outer surface of the leaf spring portion 460a which is that surface apparent in FIG. 1. The flanges 472a keep the roller 472 centered on the leaf spring 460. With this rotation of the knob 474, the roller 472 rolls within the indentation 460c and along the side of the indentation next to the boss 460d and its center moves downwardly and on the arc x and radius r shown in FIG. 3 and works against the inherent resilience of the leaf spring 460 to straighten the spring 460 and slightly reverse the bow for moving the collet 456 toward the machine hub 430. This spring straightening action is due to two different actions: (1) The movement of the centers of roller 472 and eccentric shaft portion 470b from right to left as seen in FIG. 3 and (2) the movement of roller 472 out of depression 460c and on to boss 460d. As the knob 474, the shaft 470 and the roller 472 complete their movement, the roller 472 passes across the boss 460d; and the boss 460d then acts as an overcenter detent with respect to the roller 472, holding the roller 472, the shaft 470 and the knob 474 in their new positions rotated through approximately 90 degrees. During this completion of movement of these parts, the collet 456 has made a complete movement toward the hub 430, and its tapered end portion 456a has entered the cavity 430b of the machine hub. The face portion 456c is in contact with the face portion 430a except for the existence of the disk 332 of the diskette 330 between the face portions 456c and 430a, and the spring 460 due to its resilience clamps the disk 332 between the collet 456 and the hub 430. The spring 460 bears on the frame 422 at the opposite ends of the spring at this time, and the roller 472 forcefully bears on the spring close to collet 456 to provide the clamping force of the collet 456 on the hub 430. The hub 430 is driven by the motor 436 while the disk is so clamped between the collet 456 and hub 430 to drive the disk 332.

The boss 462 constitutes a pivotal connection of the spring 460 with the frame 422, and the shaft 458 thus moves in the arc a during this movement of the collet 456 toward the machine hub 430. The spring 460 so functions that the face portions 456c and 430a are nearly parallel at the time that the collet 456 moves into engagement with the hub 430, and the center lines C and c of hub 430 and collet 456 are nearly in coincidence. This is very accurately true just as the collet 456 clamps the disk 332 on to the hub 430. Thus, the collet 456 when clamping the disk 332 between it and the hub 430 exerts no substantial force on the disk at right angles to the center lines C and c so that the disk is not then thrust sidewardly and is gripped with uniform pressure on the faces 456c and 430a and on the inner margin of the disk 332.

The wide and narrow spring leg portions 460a and 460b in particular cause the collet surface 456c to remain in near parallelism with the hub surface 430a for most of the engaging motion of the collet 456 with respect to the hub 430 due to the fact that the relatively weak thin leg portion 460b of the spring 460 provides a rotational moment b which increases the closer that the collet 456 approaches the hub 430, thus bending the relatively wide strong spring leg portion 460a between the place at which the roller 472 is effective on the leg portion 460a and the center line c with an increasing amount as the collet 456 approaches the hub 430. The leg portions 460a and 460b are particularly so effective when the collet flange 456b is about to contact the hub 430 except for the flexible disk 332 between them. The boss 462 functioning as a pivotal connection of the spring 460 causes the boss 462 and the center lines C and c to be and remain in the same vertical plane throughout the movement of the collet 456 toward the hub 430. Due to the effect of the relatively narrow leg portion 460b effective to slightly bend the leg portion 460a, the center lines C and c also remain in nearly the same horizontal plane as the collet 456 moves toward an engaging position with respect to the hub 430. As is apparent, the relatively narrow leaf spring portion 460b slides in the slot 468 between the stops 466 as the collet 456 moves toward the hub 430, and the leaf spring 460 is supported at both its ends and acts as a bowed beam, the bowing of which is reduced and reversed by the roller 472 acting intermediate the ends of the spring 460.

Since the leaf spring 460 tends to move through an arc of motion a at shaft 458 about the boss 462, the distance T between a horizontal extension of the center line c and a horizontal line through the boss 462 would be expected to vary depending upon the angular position of the leaf spring 460 about the boss 462. This distance T also would be expected to vary as the leaf spring curved shape changes, the curved shape flattening under the influence of the force exerted by the narrow leg portion 460b supported in the slot 468. These two changes of distance T almost counteract each other so that the collet 456 moves toward boss 462 with the distance T remaining nearly constant and thus with the center lines C and c remaining substantially coincident.

With the disk 332 of the diskette 330 being clamped between the collet 456 and hub 430, the transducers of carriage 70 are used for data transfer with respect to the disk 332. When this is completed, the diskette 330 may be released with respect to the hub 430 and collet 456 by rotating the knob 474 back into its original position in which it is illustrated in FIG. 2. The shaft 470 rotates correspondingly, and the roller 472 rolls back across the boss 460d into the depression 460c, with corresponding outward bowing action of the spring 460 taking place, so that the spring 460 moves back into its FIG. 3 condition and at the same time moves the collet 456 out of engaging position with respect to the hub 430 and separates the collet 456 with respect to the hub 430. The wing portion 474a of the knob 474 thus is moved out of alignment with the slot 424, and the diskette 330 may be withdrawn from the machine through the slot 424.

Advantageously, the loading apparatus for the collet 456 including bowed leaf spring 460, shaft 470 and roller 472 loads collet 456 in nearly a straight line motion with no side motion that would tend to cause the disk 332 of the diskette 330 to move sidewardly out of proper position with respect to the hub 430. This is particularly true for the last increment of movement of the collet 456 toward the hub 430. The loading apparatus also causes the collet flange face 456c to bear squarely and with uniform pressure on the hub face 430a for the complete circumferences of these faces so that there is no distortion of the disk 332 about its central hole 340. The bowed leaf spring 460 advantageously provides a means for supporting the collet 456 which is thin in the direction of the center lines c and C and which thus allows a relatively thin disk drive machine.

Having thus described the invention, what is claimed as new, and desired to secure by Letters Patent is:

1. Apparatus for gripping and rotatably driving a magnetic disk having a central hole through it including:
   a machine frame,
   a drive hub rotatably disposed with respect to said frame,
   a collet for moving toward said hub for thereby gripping the disk about its central hole between the collet and the hub,
   a leaf spring supported by said frame adjacent the two ends of said spring and carrying said collet at a place intermediate the ends of the spring, and
   means for applying a force on said spring between its ends to longitudinally bend the spring and move said collet toward said hub to engage the disk between the collet and hub.

2. Apparatus as set forth in claim 1, said force applying means being effective on said leaf spring between one of its ends and the place at which said collet is carried by the spring.

3. Apparatus as set forth in claim 1 and including means for pivotally mounting said leaf spring on said frame at one end of the spring and means providing a sliding connection of the spring with respect to said frame at the other end of the spring.

4. Apparatus as set forth in claim 1, said leaf spring being bowed in a direction away from said drive hub and being forced back toward a straighter disposition by said force applying means in order to move said collet toward said hub.

5. Apparatus as set forth in claim 1, said force applying means including a rotatable member carried by said frame and having an eccentrically located part which is effective on said spring between one of the ends of the spring and the place at which said collet is mounted on the spring so that when said member is rotated it acts on said spring and moves said collet toward said hub.

6. Apparatus as set forth in claim 5, said spring including a depressed portion in which said eccentric part rests when said collet is in an initial position spaced from said hub and having a boss over which the eccentric part travels during rotation of said rotatable member for acting as a detent with respect to said spring and collet in the position of said collet engaged with respect to said hub.

7. Apparatus as set forth in claim 6, said depressed portion and said boss in said spring being located between the place of attachment of said collet to said spring and one end of the spring and said last-named end of the spring having a pivotal connection with said frame and the spring having a sliding connection at its other end with respect to said frame.

8. Apparatus as set forth in claim 7, said spring initially being outwardly bowed away from said hub, and said rotatable member and eccentric part being effective to reduce the bowing of said spring when moving said collet into engaging relation with said hub.

9. Apparatus as set forth in claim 1, said spring being bowed and said force applying means in all conditions of the apparatus as assembled applying a force on said spring holding it with a bow less than the bow of the spring in a free condition whereby the spring is thus held against said frame adjacent the two ends of the spring.

10. Apparatus as set forth in claim 1, said force applying means including a rotatable member carried by said frame and having an eccentrically located part which is effective on said spring between one of the ends of the spring and the place at which said collet is mounted on the spring so that when said member is rotated it acts on said spring and moves said collet toward said hub, said eccentrically located part holding said spring with a bow which is less than the bow of the spring when the spring is in free condition so that the spring yieldingly holds the eccentrically located part in its rotative position corresponding to collet disengagement with respect to said hub.

* * * * *